(12) United States Patent
Fiedler

(10) Patent No.: US 8,805,773 B2
(45) Date of Patent: Aug. 12, 2014

(54) MINIMIZING LATENCY IN NETWORK PROGRAM THROUGH TRANSFER OF AUTHORITY OVER PROGRAM ASSETS

(75) Inventor: Glenn Fiedler, Santa Monica, CA (US)

(73) Assignee: Sony Computer Entertainment America, LLC, San Mateo, CA (US)

( * ) Notice: Subject to any disclaimer, the term of this patent is extended or adjusted under 35 U.S.C. 154(b) by 519 days.

(21) Appl. No.: 12/876,000

(22) Filed: Sep. 3, 2010

(65) Prior Publication Data

US 2012/0059783 A1 Mar. 8, 2012

(51) Int. Cl.
*G06F 15/00* (2006.01)
*G06F 15/18* (2006.01)

(52) U.S. Cl.
USPC ............................................. 706/62

(58) Field of Classification Search
None
See application file for complete search history.

(56) References Cited

U.S. PATENT DOCUMENTS

2003/0028585 A1* 2/2003 Yeager et al. ............... 709/201
2005/0071306 A1* 3/2005 Kruszewski et al. ......... 706/47
2009/0061989 A1* 3/2009 Kim ............................. 463/23
2009/0197686 A1* 8/2009 Bergelt et al. ............... 463/43
2010/0056275 A1* 3/2010 Wilson et al. ............... 463/32

OTHER PUBLICATIONS

'Artificial intelligence A modern approach': Russell, 2003, Prentice Hall—Pearson Education.*
A dynamic load balancing for massive multiplayer online game server: Lim, ICEC 2006, LNCS 4161, pp. 239-249, 2006.*
A dynamic load balancing model for the multi-server online game systems: Chen 2004 citeseer.*

* cited by examiner

*Primary Examiner* — Kakali Chaki
*Assistant Examiner* — Peter Coughlan
(74) *Attorney, Agent, or Firm* — Joshua D. Isenberg; JDI Patent

(57) ABSTRACT

Authority over an artificial intelligence (AI) asset can be controlled among two or more processing devices running a common program over a network using a technique in which authority can be transferred. A first processing device can exercise authority over the AI asset by executing code that controls one or more actions of the AI asset according to a decision tree. The decision tree can determine whether to engage the program asset based on criteria other than a distance between the AI asset and the program asset. The first processing device can broadcast a state of the AI asset to one or more other devices running the program. If the decision tree determines that the AI asset should engage a program asset over which another processing device has authority the first processing device can relinquish authority over the AI asset and transfer authority to the other device.

21 Claims, 9 Drawing Sheets

MINIMIZING LATENCY IN NETWORK PROGRAM THROUGH TRANSFER OF AUTHORITY OVER PROGRAM ASSETS

FIELD OF THE INVENTION

Embodiments of the invention are related to programs implemented on multiple devices connected by a network and more specifically to techniques for minimizing perceived latency when two or more users interact with non-user-controlled assets.

BACKGROUND OF THE INVENTION

Online game technology provides a mechanism by which players located at remote sites can play interactive games with each other over a computer network, such as the Internet. The interactive games may range from simple text based games involving only a single player or a few players to games incorporating complex graphics and virtual worlds populated by many players simultaneously. Many online games have associated online communities, making such online games a form of social activity allowing players from all over the globe to participate in games and otherwise interact with each other.

Online games often include two types of assets referred to herein as user assets and artificial intelligence (AI) assets. User assets are assets that are directly controlled by a user. By way of example, in an online game, a user's actions are often represented by a character, referred to as an avatar. The user has exclusive control over certain actions of the avatar. Such control is typically exercised through an interface, e.g., a game controller, joystick, keyboard or other input device that the user manipulates. The user's commands affect the state (e.g., position, velocity and movements (e.g., fighting moves) of the avatar through a computer device, e.g., a game console, personal computer, or mobile device that is connected to other user devices and perhaps a server via a network. The avatar's state may be broadcast over a network to other devices, which can interpret the state information and present a display of the avatar so that users of those devices can perceive the avatar.

Many online games often include assets in the form of objects that player characters can possess. An example of such an object is the ball in a sports game. In many such games, the player character possessing the object determines the movements and actions of that object. Often these decisions are made by the machine of the player that possesses the object. Possession of the object is often determined by distance between the object and the nearest player character. AI assets, on the other hand are controlled by the game program and not by any particular user. Like a user asset, an AI asset may have a state that defines the AI asset's position, velocity and movements. The state may change according to a decision tree that can be implemented as software code. In conventional online games, AI assets are controlled by a server. The server executes the software code that runs the decision tree that determines the state of the AI asset and then broadcasts the state of the AI asset to user devices (referred as client devices) that are connected to the server via a network. It is impractical to assign control over AI assets to player characters since AI assets tend to behave independently, unlike game objects.

A problem can arise during interaction between a user asset and an AI asset due to network latency. It is desirable for actions in a networked game to look and feel like a single player combat game. In a single player combat game designers often slow time down so that the player can feel more powerful. This is relatively easy to do if the code controlling the AI asset and the user asset are executed by the same device. However, this is difficult, if not impossible, to implement over a network when the user asset code is run on a client device and the AI asset code is run on a remote server.

Traditional latency hiding techniques such as client side prediction as used in FPS games are designed for games where players interact "indirectly" with other players and AI assets using ranged weapons. It is difficult to apply the FPS latency compensation techniques to hide latency in a combat based game where players interact directly with AI assets via melee attack moves, grabs and throws.

By way of example, in an online combat game based on a standard client/server networking model 100 e.g., as depicted in FIG. 1, AI assets run on a server 102. Players can interact with the AI assets via client devices 104, 106. If this technique were used to network a combat intensive game, the client players would feel latency in their interaction with the AI characters. For example, the client player would notice that the AI assets have some additional delay before they attack, and some delay before playing hit reactions to the player's attacks. This negatively impacts the feel of the combat.

Consider a prior art client/server networking model with three players running on similar devices 102, 104, 106 that can communicate with each other over a network 108. In this example two of the players' devices 104, 106 act as clients and one player's device 102 acts as the server. In such a case, the device 102 that acts as the server is called an integrated server, because the client and server code are running on that machine. This is in contrast to a dedicated server hosted in a data center that each player's device connects to.

Now consider a combat based game which is to be networked using this client/server networking model. In the pure client/server model depicted in FIG. 1, networking operates as follows:

On the client side, each client 104, 106 acts as a dumb terminal with each player sending their input to the server, and interpolating between state updates received from the server to provide the illusion of smooth movement of networked entities.

On the server side, each time through the loop input packets are processed from clients, if no input packet is received input is assumed to have not changed. The current state of all relevant players and characters are broadcast to clients. After which then the game update occurs, in which players and AI characters are updated according to the game rules.

In this pure client/server model the game code runs only on the server 102. All clients except the player who is the integrated server perceive latency in their own actions, as well as the actions of the AI assets. Such actions may include: movement, attack animations, block animations and reactions to getting hit.

In such a prior art implementation it is possible to hide the latency of a client player's own actions by using a technique called client side prediction, however this technique is difficult to implement in a combat based game, due to the complexity of player character and animation code. In client-side prediction a client locally reacts to user input before the server 102 has acknowledged the input and updated the game state. Rather than sending control input to the server 102 and waiting for an updated game state in return, the client also, in parallel with this, predicts the game state locally, and gives the user feedback without awaiting an updated game state from the server. Unfortunately, client side prediction only hides the latency of a player's own actions, it does not hide the latency of the actions performed by AI characters with which that player interacts.

It is within this context that embodiments of the present invention arise.

SUMMARY

Disadvantages associated with the prior art are over come by embodiments of the invention including a computer implemented method for controlling authority over an artificial intelligence (AI) asset among two or more processing devices running a common program over a network and a related device and non-transitory computer-readable medium.

According to the method a first processing device can exercise authority over the AI asset by executing code on the first processing device. The code controls one or more actions of the AI asset according to a decision tree. The decision tree determines whether to engage the program asset based on one or more criteria other than a distance between the AI asset and the program asset. The first processing device can broadcast a state of the AI asset to one or more other devices running the common program over the network. If the decision tree determines that the AI asset should engage a program asset over which another processing device has authority the first processing device can relinquish authority over the AI asset by stopping execution of the code and transferring authority over the AI asset to one of the other devices running the common program over the network.

In some implementations, after transferring authority, the first processing device may receive the state of the AI asset from other device to which the authority over the AI asset was transferred.

In some implementations, the common program can be a game program and the AI asset can be a non-player character in the game program. In such an implementation, the first processing device can control the actions of a player character and broadcast a state of that player character to one or more other devices running the common program over the network.

In certain implementations the first processing device can receive the state of another AI asset over which the first processing device has not authority from another device running the common program over the network.

In certain implementations the first processing device can be a default processing device for the AI asset.

In certain implementations authority over the AI asset could be transferred to the first processing device from another processing device on the network.

In certain implementations, the first processing device can execute code that controls one or more actions of more than one AI asset.

In certain implementations the first processing device can exercise exclusive authority over a user asset of the common program that is uniquely associated with a user of the first processing device by executing code that controls one or more actions of the user asset. In such implementations the common program can be a game program, wherein the AI is a non-player character, and the user asset is a player character.

According to an alternative embodiment, the computer processing device referred to above, may include a processor, a memory, and one or more processor executable instructions embodied in the memory and configured for execution on the processor. The instructions are configured to implement the above-described method for controlling authority over an artificial intelligence (AI) asset among two or more processing devices running a common program over a network.

In some implementations, the processing device can have default authority over the AI asset.

In some implementations, the processing device can have default authority over the AI asset and one or more other AI assets. In such implementations the processing device may have exclusive authority over an asset of the common program that is uniquely associated with a user of the processing device.

A non-transitory computer-readable medium may have embodied therein one or more processor executable instructions configured to implement the above-described method for controlling authority over an artificial intelligence (AI) asset among two or more processing devices running a common program over a network.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Embodiments of the present invention solve this problem of latency in interacting with AI assets in a networked computer program by employing a hybrid P2P networking model in which AI assets migrate from one machine to another such that the code for the AI assets run on the machine of the user asset that they are currently engaging.

This optimizes the player's experience in the common case, making it appear as if each player is interacting with AI assets with zero latency. This preserves the same feel of single user interaction with AI assets while enabling multiple players to join together engaging AI assets in an online program that involves intensive interactions between users and AI assets. Embodiments of the present invention utilize an alternative latency hiding technique suitable for networking player vs. AI combat interactions in cooperative (COOP) or competitive combat-based games.

Figure 1:
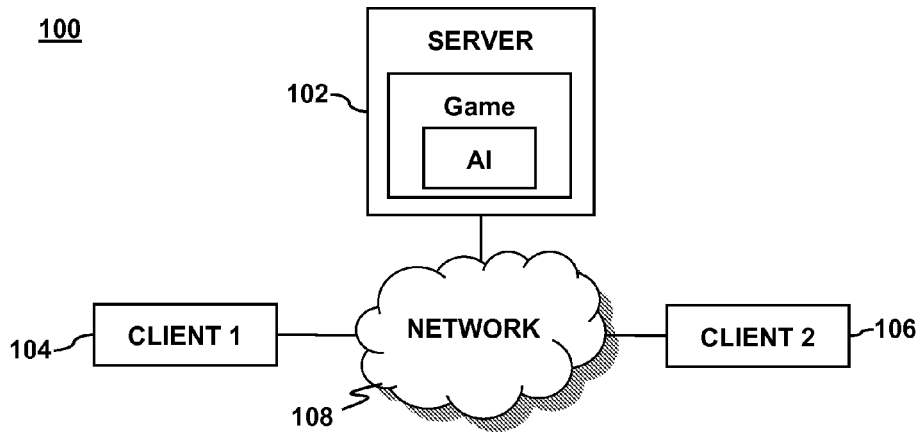
FIG. 1 illustrates an example of a prior art configuration for implementing an online game over a network.
Figure 2:
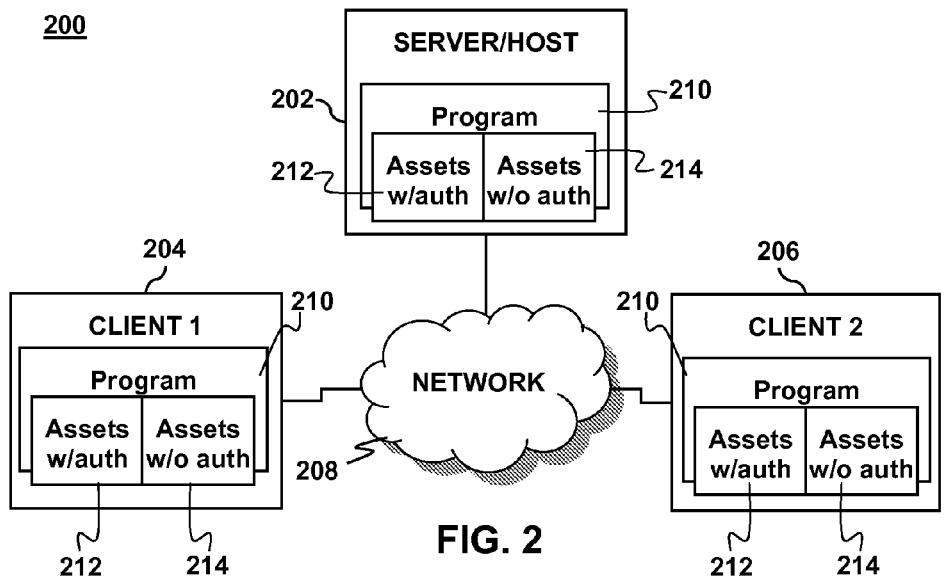
FIG. 2 illustrates an example of a network configuration for implementing a computer program over a network in a manner that facilitates authority transfer over AI assets according to an embodiment of the invention.

FIG. 2 illustrates an example of a network environment 200 in which an embodiment of the present invention may be implemented. In general, the network environment 200 may include a server/host 202 and clients 204, 206 may be connected to each other over the network 208. By way of example, and not by way of limitation, the server/host 202 and clients 204, 206 may be connected to each other over the network 208 in a peer-to-peer (P2P) networking configuration. In a peer-to-peer (P2P) networking configuration the common program 210 runs on the server/host 202 as well as all of the client devices 204, 206. Online games are often implemented using peer to peer networks. A P2P network is a type of distributed data network without any centralized hierarchy or organization. Peer to peer data networks can provide a robust and flexible means of communicating information between large numbers of computers or other information devices, referred to in general as nodes. In a P2P network, each node within the P2P network is defined as a peer of every other computing system within the network. Each node within the P2P network may be configured to execute software having substantially equivalent functionality. Therefore, each node may act as both a provider and a user of data and services across the P2P network. Peer to peer data networks can provide a robust and flexible means of communicating information between large numbers of computers or other information devices, referred to in general as nodes.

In some P2P networks, one node may be selected to act as a "host" to control certain centralized functions. Such functions may include coordinating communication amongst the other nodes, coordinating entry of new nodes into the network, or control over certain program assets. The host is similar to a server in that it is the only node that provides these centralized functions. However, a host is different from a server in that all of the nodes, not just the host, run the common program. Consequently, any node may act as the host should the need arise.

In the example depicted in FIG. 2, there are three nodes 202, 204, 206 with node 202 acting as the host. It is noted that although only three nodes are depicted in FIG. 2, those of skill in the art will recognize that any number of nodes greater than two may be used in embodiments of the present invention. Furthermore, although FIG. 2 depicts only a single node acting as a server/host, those skilled in the art will recognize that some of the host's duties may be split amongst two or more nodes.

A P2P network relies primarily on the computing power and bandwidth of the nodes in the network rather than concentrating it in a relatively low number of servers. P2P networks are typically used for connecting nodes via largely ad hoc connections. Such networks are useful for many purposes. P2P networks may be used, e.g., for sharing content files containing audio, video, data or anything in digital format is very common, and real-time data, such as telephony traffic, may also be transmitted using P2P technology.

Applications implemented via P2P networks may be subject to latency. The latency is largely a result of the time required to transmit data over the P2P network. Many online applications, such as video games attempt to hide the effect of such latency to that it is less perceptible to users of the application.

By way of example, in the case of a first person shooter (FPS)-type game the game simulation does not need to run in deterministic lockstep as is the case with real-time strategy (RTS) games. Instead the game simulation runs asynchronously. Synchronization can be performed by defining a direction of flow for state and events for particular game asset based on which machine has "authority" over that asset. In embodiments of the present invention, program code can be modified so that each device participating in the network has an "authority" side, and a "non-authority side". Data including network state and event information flows from authority to non-authority. In general, program assets may include user assets that are uniquely associated with a particular user and artificial intelligence (AI) assets that are not. The state and events of a user asset may be controlled, at least in part, by code the runs exclusively on that user's machine. In embodiments of the present invention, the authority over the state and events for AI assets can be transferred among the server/host 202 and clients 204, 206.

Figure 3:
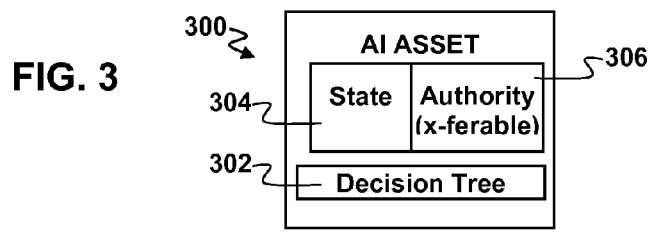
FIG. 3 is a block diagram illustrating an example of an AI asset having transferable authority according to an embodiment of the invention.
Figure 4:
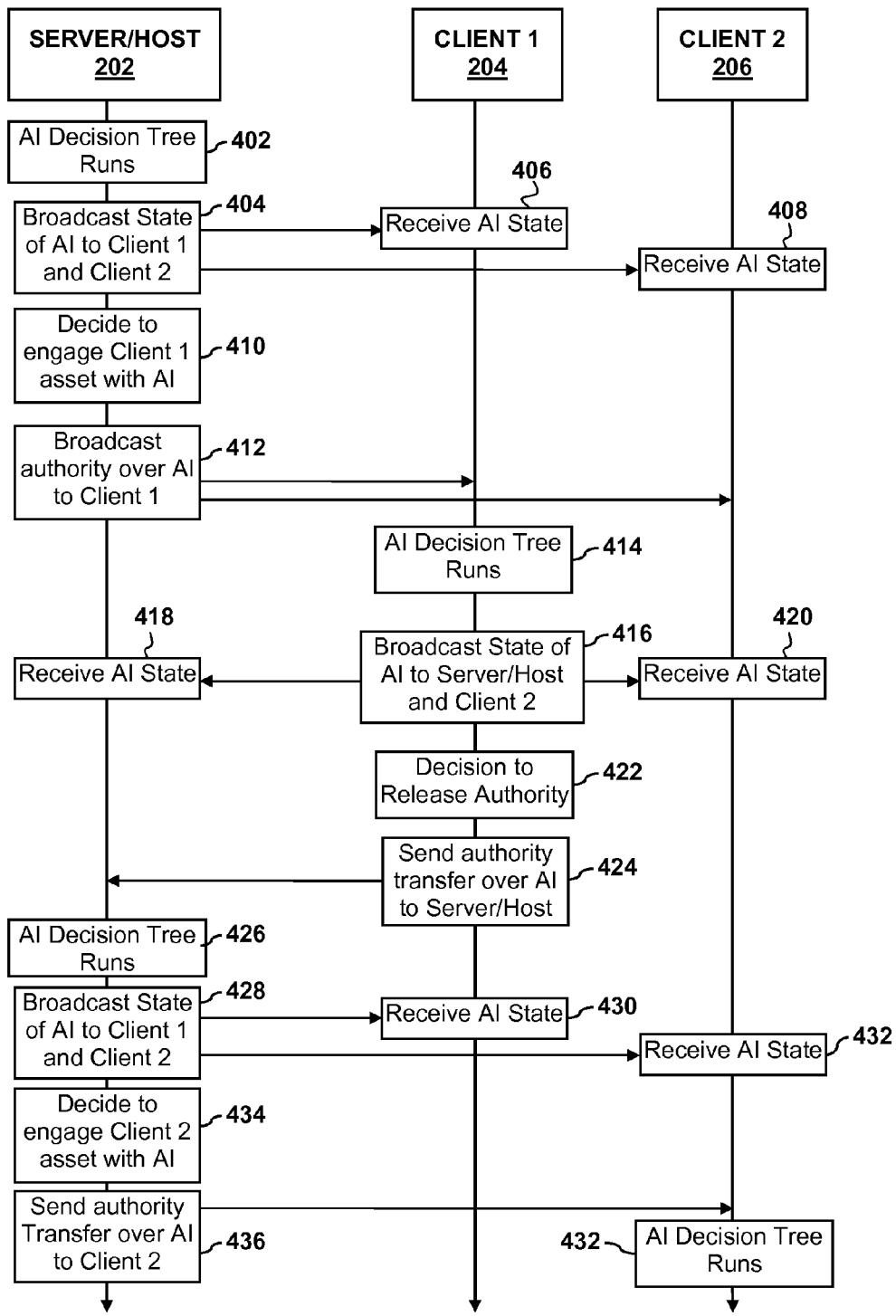
FIG. 4 is a flow diagram illustrating transfer of authority over an AI asset in accordance with an embodiment of the invention.

FIG. 3 illustrates an example of an AI program asset 300 in accordance with an embodiment of the present invention. The AI program asset 300 may generally include code and data that can be stored in a non-transitory computer-readable medium and transferred over a network, such as network 208. The code may include a decision tree 302 that determines the actions of the AI asset and the interactions with other assets of the common program. The decision tree may determine where the AI asset will go within a simulated environment generated by the common program. The decision tree may also determine whether the AI asset will interact with any other program assets, which assets the AI asset will attempt to interact with, and the nature of such interaction. The data may include a state 304 and an authority 306. The state 304 may include information regarding a current condition of the AI asset. Such information may include a position, orientation, and velocity of the asset with reference to the simulated environment, information regarding actions that the asset has performed in the past or past actions that have been performed on the asset, a current target of the asset, or a current mode of operation of the asset. The authority 306 may include information identifying which node of the network executes the decision tree for the AI asset. In embodiments of the present invention, the authority 306 for the asset 300 can be transferred from one node to another in accordance with decisions made by the decision tree 302.

The decision tree 302 can determine whether the AI asset 300 will engage in interaction with a user-controlled program asset, such as a player character. The AI asset may engage the user-controlled program asset, e.g., by simulated combat, simulated conversation, or other simulated interaction with the user-controlled program asset.

As seen in FIG. 2, in addition to the common program 210 each node 202, 204, 206 has a first set of program assets 212 over which it has authority and a second set of program assets 214 over which it has no authority. It is noted that these two sets are in general different for each node in the network environment 200. By way of non-limiting example, the common program may be an online video game. As noted above, each user (referred to as players) may play the game via a node. Each node may control a player character, which may be represented by an avatar. The game may also include AI assets in the form of non-player characters that are represented by corresponding avatars. The program 210 may control physics simulations that determine the interactions between player characters and a simulated environment, the non-player characters, or each other. Such interactions may result in corresponding changes of state for the player characters, non-player characters, or the simulated environment itself. These changes in state may be used to drive animation engines on each node that allow the environment, the player characters, and the non-player characters to be displayed on video displays associated with each node.

In this example each player's node always has authority over local character for that player. Therefore state such as position, orientation, velocity, and actions, e.g., attack, block, play hit reaction, for player character on node 204 are broadcast from node 204 to nodes 202 and 206 such that they are applied to drive the game simulation forward in the remote view of each remote player character. Similarly, information relating to the player character simulated on node 202 is broadcast from nodes 204 and 206 and so on.

Authority for AI assets is more complex than for player characters. By default, each AI asset can have a default authority. As used herein, default authority means that the AI asset runs on a node with default authority, e.g., the server/host 202, which broadcast the state of the AI asset to the other nodes, e.g., nodes 204, 206.

This model differs from the prior art in that AI assets are able to migrate, such that they run on any player's machine. Running in this context means that the AI asset's "brain" or "decision tree" are made on that player's machine, instead of being made on the server. As noted above, the AI asset's "brain" or decision tree 302 determines all decision making aspects of what the AI does—which animations it plays, whether it decides to attack or retreat, whether it is hit or blocks, Effectively, when the AI asset's decision tree transfers authority to a player's machine, it is "like" that player's machine is now the "server" for that AI asset.

By way of example, and not by way of limitation, in the context of a close combat game program, the AI asset 300 may operate as follows:

An AI asset 300 may be in one of three modes: wandering, patrolling or attacking. In the wandering mode, the AI asset 300 may randomly walk around a level without direction. In the patrolling mode 300 may follow a set of waypoints around a level, e.g., like a guard patrol path where the guard walks around a wall or other predetermined perimeter. It is noted that the wandering and patrolling modes are meant as examples of things that an AI asset may do while not targeting a player character, e.g., a default authority behavior that could run on the server/host. An AI asset may optionally have a target. This target may be one of the player characters for nodes 202, 204, or 206. If the AI is in the wandering or patrolling state, the target must be NULL. If the AI asset 300 is in the attacking state its target must be set. By way of example, an AI asset may enter the attacking state if a player character attacks the AI asset or if the AI asset comes within some pre-defined attacking distance of a player character in the simulated environment. The decision tree 302 for the AI asset 300 decides what it should do next. For example, the decision tree makes decisions such as selecting a target, choosing a direction of movement, and deciding whether to attack or retreat.

Figure 5A:
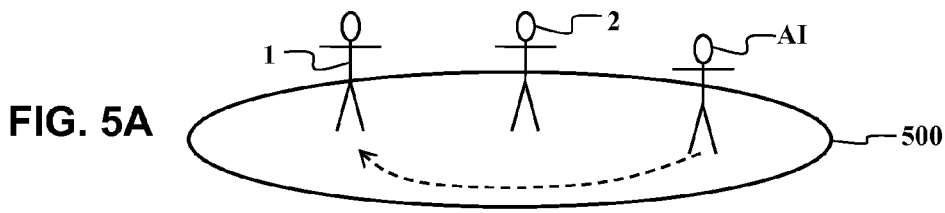
FIGS. 5A-5D are diagrams illustrating an example of transfer of authority over an AI asset in which the AI assets are characters in a virtual world.

By way of example, an embodiment of the invention may work as illustrated in FIG. 4 and FIGS. 5A-5D. In this example, as shown in FIG. 5A, an AI asset AI in a simulated environment 500 may be in a default initial state (e.g., in which the AI asset AI is in a wandering or patrolling mode) in which the AI asset AI has "default authority" in which case the AI asset may operate in a traditional mode as in the prior art. Specifically, the decision tree for the AI asset AI may run on the server/host 202 by default as indicated at 402 in FIG. 4. The server/host 202 broadcasts updates for the state, e.g., current position, orientation velocity of the AI asset AI etc., as well as events such as "attack", "block" "play hit reaction" to client devices for players as indicated at 404. The clients' devices, e.g., Client 1 204 and Client 2 206, receive these state updates as indicated at 406 and 408 respectively. It is noted that the server/host 202 may have authority over its own player character (not shown). However, this has been omitted for the sake of clarity.

As may be seen in FIG. 5A, initially, Client 1 204 has exclusive authority over a first player character 1 and non-authority over a second player character 2 and the AI asset AI. Client 2 206 initially has exclusive authority over the second player character 2 and non-authority over the first player character 1 and the AI asset AI.

At a later time, the decision tree for the AI asset AI may target one of the player characters, e.g., the first player character 1. In such a case, authority over the AI asset AI is transferred such that it has authority equal to an identifier (ID) of the player character the AI asset AI is targeting (the first player character 1). This is decided by the decision tree for the AI asset AI running on the server/host 202 as indicated at 410 and is communicated to players by broadcasting an "authority transfer" to all players in the game as indicated at 412.

Post-transfer the AI decision tree or "brain" runs on the machine of the player which it is targeting, which is not the server/host 202. In the present example, the decision tree for the AI asset AI would run on Client 1 204 as indicated at 414. The flow of AI state (position, velocity, orientation etc. . . . ) as well as AI events (attack, block, play hit reaction) are now broadcast from the authority machine (the targeted player's machine—Client device 1 204) to other players' devices in the game, the non-authority side of that character as indicated at 416. In the example depicted in FIG. 4, the state and events are received by Client device 2 204 and the server/host 202 as indicated at 420 and 418 respectively. This is in marked contrast to the prior art where AI data always flows from server to client.

Figure 5B:
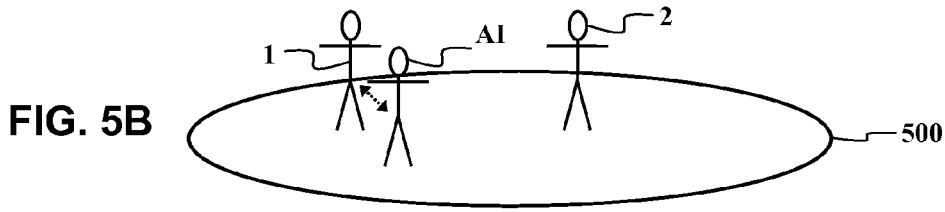

As seen in FIG. 5B, Client 1 204 now has authority over the first player character 1 and the AI asset AI and non-authority over the second player character and the AI asset AI. Client 2 206 has authority over the second player character 2 and non-authority over the first player character 1 and the AI asset AI. The server/host 202 has authority over no assets and non-authority over the first player character 1, the second player character 2, and the AI asset AI. The decision tree for the AI asset AI determines whether to engage a particular player based on one or more criteria other than a distance between the AI asset and the nearest player. By this it is meant that the decision tree may take distance to the nearest player into account, but not exclusively. The decision tree for the AI asset AI may decide to randomly target a player or may target a player based on the game state. For example, the decision tree for the AI asset AI may decide to target a player character if the player character possesses a specific game object or is engaged in specific activities or has previously engaged in specific activities that are unrelated to the distance between the player character and the AI asset AI.

Authority control based on an AI decision tree criteria other than distance has several advantages over prior art AI asset authority control based on distance to the nearest player. For example, consider a game situation where two players are fighting a large number (e.g., 10 AI assets) in close quarters in a small room. If authority over each AI asset is driven by nearest player alone, as AI assets and players moved around there would be a lot of oscillation in authority from one machine to another. Driving authority by a target determined by an AI decision tree, by contrast, allows AI assets to hold their authority based on the player they are targeting. This allows the AI assets to make decisions to move closer towards the target player or players to attack them without having their authority being "distracted" by other players that move near to a given AI asset while that AI is executing its current goal. Of course, the decision tree can also take distance into account, using some weighting system, but it is not forced to assign authority based on distance alone as with nearest player authority systems.

Assigning authority over AI assets based on an AI decision tree is also advantageous if an AI asset is attacking a player with ranged attacks. For example, it is desirable for AI assets attacking a player via bow and arrow to run on the machine of the player which they are attacking, so that an AI asset can aim at a targeted player character running in the same time stream as the AI. Otherwise the AI asset's ranged attacks will be inaccurate proportional to the amount of latency between the player's machine and the machine running the AI asset. Target-based authority works better in this situation than distance to nearest player based authority.

Assigning authority over AI assets based on an AI decision tree is also advantageous if an AI asset is attacking a first player character in close quarters with a weapon such as a pike, such that there is some distance between the AI asset and the player it is attacking. Then consider that a second player is able to sneak up "behind" the AI asset without the AI asset becoming aware of this. In this case it is obviously preferable for the AI asset to continue to run on the machine of the first player which it is still attacking, instead of transferring authority to run on the machine of the second player character who sneaked up behind the AI asset and who is now closer. Of course if the second player were to accidentally make a sound, or the AI asset were otherwise made "aware" that the second player attacked it from behind, the AI asset's decision tree could decide to target the second player, and authority over the AI asset could be transferred to the second player's machine at that point.

If the decision tree for AI asset AI running on Client 1 204 decides to target another player, or clears its target back to null (perhaps it has decided to return to wandering or patrolling modes) as indicated at 422, the client player sends a "release authority" event back to the server as indicated at 424. This event may optionally contain a "hint" of which player id the authority machine has decided should be the next target, if any for the AI asset. In this way, the player's machines are able to release authority over an AI asset which is no longer targeting their local player characters. Once authority has been transferred back to the server/host 202, the decision tree for the AI asset AI runs on the server/host 202 as indicated at 426. The server/host 202 broadcasts the state and events for the AI asset AI as indicated at 428. Client 1 204 and Client 2 206 receive the state and events as indicated at 430 and 432 respectively.

It is important to note that in embodiments of the present invention the server/host 202 always arbitrates authority. Clients do not transfer authority directly between one another. The reason for this is so that each client sees the same sequence of authority events in the same order, because they all come from the server/host, as opposed to being broadcast P2P from each player as they release them. It is noted that there is no guarantee of relative event order across different nodes in the P2P node mesh. In effect an ordering can be created by deciding that the ordering of events is the order that the server receives them. Once the server broadcasts events to the clients, all server events come from the same source and are therefore guaranteed to be in the same order across all clients.

Figure 5C:
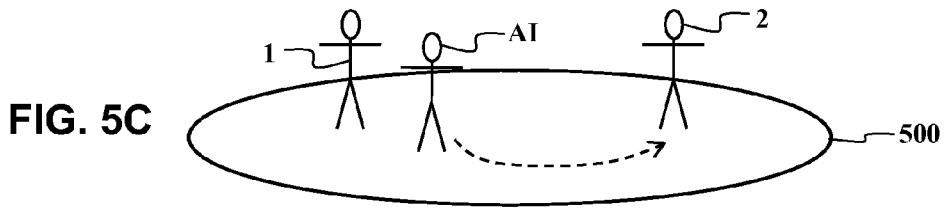

For example, if the decision tree for an AI running on Client 1 204 decides to attack the second player character 2, then Client 1 204 does not directly transfer authority to Client 2 206, instead Client 1 204 releases the authority it has over the AI asset AI back to the server/host 202. As seen in FIG. 5C, the server host 202 once again has authority over the AI asset AI and non-authority over the first player character 1 and the second player character 2. Client 1 204 now has authority over the first player character 1 and non-authority over the second player character 2 and the AI asset AI. Client 2 206 now has authority over the second player character 2 and non-authority over the first player character 1 and the AI asset AI.

Figure 5D:
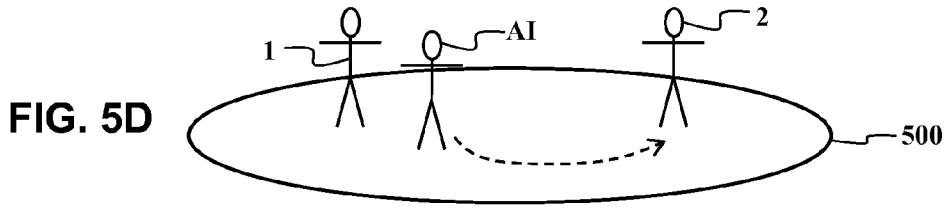

When releasing authority over the AI asset AI Client 1 may send a "hint" that authority over the AI asset AI should probably transfer to Client 2 206. Provided that the server/host 202 agrees with this (as indicated at 434, the server/host can broadcast an "authority transfer event" to Client 1 204 and Client 2 206, as indicated at 436 transferring the AI asset to run on Client 2 206 as indicated at 438. As seen in FIG. 5D the server host 202 once again has no authority and non-authority over the AI asset AI, first player character 1, and the second player character 2. Client 1 204 now has authority over the first player character 1 and non-authority over the second player character 2 and the AI asset AI. Client 2 206 now has authority over the second player character 2 and the AI asset AI and non-authority over the first player character 1.

As may be seen from the foregoing discussion, in embodiments of the present invention AI assets can be run on the machine of the player that they are targeting. In an ideal case the AI assets with which a player is interacting (e.g., engaging in combat) is the set of AI assets that have already targeted him. In this best case each player feels no latency when engaging these AI assets, because they are running locally on that player's machine. An example of this is depicted in FIGS. 6A-6B.

Figure 6A:
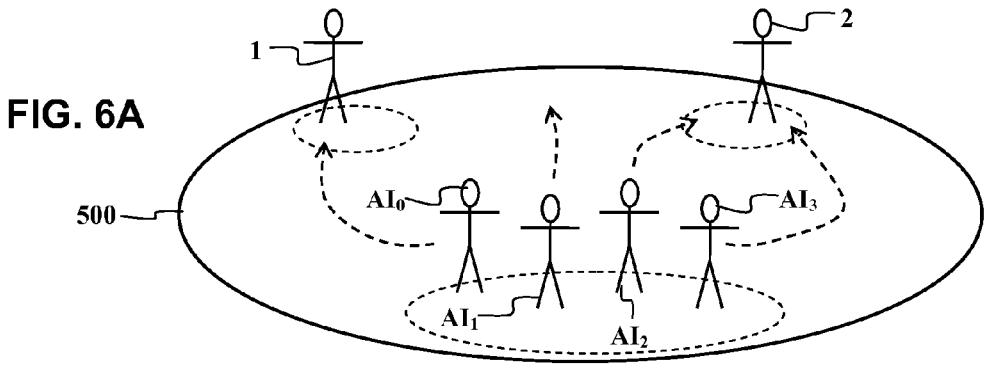
FIGS. 6A-6B are diagrams illustrating an example of transfer of authority over multiple AI assets.
Figure 6B:
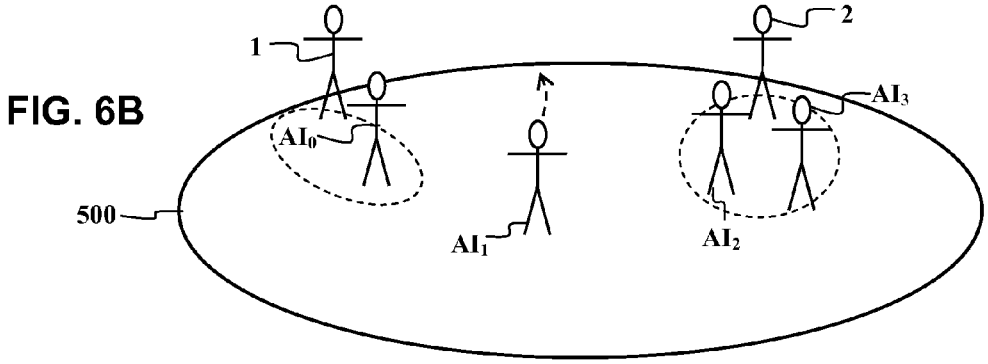

Specifically as shown in FIG. 6A, AI assets $AI_1$, $AI_2$, $AI_3$, $AI_4$ in a simulated environment 500 may each be in a default initial state in which the server/host 202 has authority over all of the AI assets and Client 1 204 and Client 2 206 only have authority over the first player character 1 and second player character 2, respectively. In this example, the decision tree for a first AI asset $AI_1$ decides to target the first player character 1 and the decision tree for a second AI asset $AI_2$ does not target any player character. For example, the second player asset $AI_2$ may be in a wandering or patrolling mode. The decision trees for a third AI asset $AI_3$ and a fourth AI asset $AI_4$ may decide to target the second player character 2.

The server/host 202 may broadcast a transfer of authority over the first AI asset $AI_1$ to Client 1 204. The server/host 202 may similarly broadcast a transfer of authority over the third and fourth AI assets $AI_3$, $AI_4$ to Client 2 206. All devices receive these broadcasts and act accordingly. As seen in FIG. 6B, the decision tree for the first AI asset $AI_1$ runs on Client 1 204, which broadcasts events and state updates for the first AI asset $AI_1$. In addition, the decision tree for the third and fourth AI assets $AI_3$, $AI_4$ run on Client 2 206, which broadcasts events and state updates for these AI assets. Furthermore, the decision tree for the second AI asset $AI_2$ runs on the server/host 202 which broadcasts the events and state updates for this AI asset.

Embodiments of the present invention allow for a case in which a player character engages an AI asset which is not currently running on that player character's machine. This may occur because the AI asset is wandering or patrolling with default authority, or because the AI asset is currently targeting another player. In this case the decision tree for the AI asset (running on the current authority machine) may notice the player character has attacked them, and may decide to change its target to the attacking player, initiating an authority transfer. In the common case this means that the attacking player may experience one lagged reaction (perhaps it plays the hit reaction a bit later than normal), but subsequent combat interactions with that AI become lag free once the AI transfers to their machine.

A less than optimal case may occur when two players deliberately engage the same AI simultaneously. In this case, there is no way around the fact that one of the players will end up engaging an AI asset that is not running on that player's machine. As a result, that player will experience some latency in reactions to the AI asset. In this case an authority arbitration rule may be used to avoid the AI oscillating authority rapidly between multiple attackers. For example, that the player character with the lowest numeric player ID could be chosen as the preferred target for the AI asset.

Embodiments of the present invention can also allow program designers to control time for the AI assets over which a given player's machine has control. Typically, each machine has its own independent time stream. Normally, a client device would operate in its time stream and the AI would react in the server's time stream, which is different from the client's time stream. As a result, the time streams for the client and server are out of phase.

If, instead, an AI asset and a user asset are run on the same machine according to the same time stream actions for both the user asset and the AI asset take place and are broadcast according a common time stream. Consequently, there is no latency problem on either the user side or spectator side.

Figure 7:
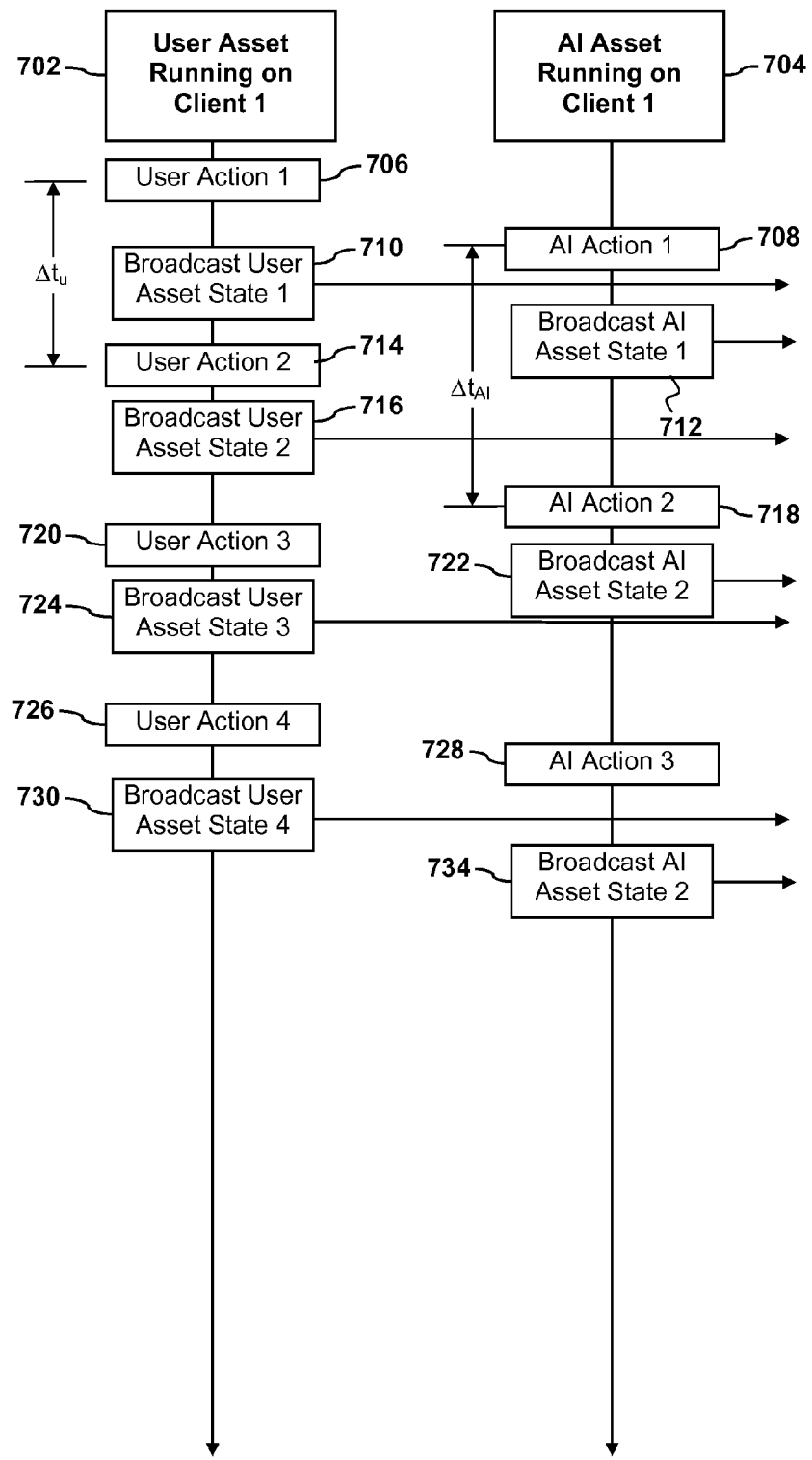
FIG. 7 is a timing diagram illustrating an example of an AI asset and a user asset running on a user's client device according to an embodiment of the present invention

Also, by moving the AI authority to the machine of the player who is fighting the AI, the designer can time scale the AI that runs on the player's machine. An example of this is illustrated in FIG. 7. In this example, a user asset 702 (e.g., first player character 1) and AI asset 704 run on the same device (e.g., Client device 1 204). User actions may occur as indicated at 706, 714, 720, and 726 at a user time interval $\Delta t_u$. State and event updates may be broadcast for the user asset in between user actions as indicated at 710, 716, 724, and 730. AI asset actions may occur as indicated at 708, 718, and 728 at an AI asset time interval $\Delta t_{AI}$. State and event updates may be broadcast for the AI asset in between AI actions as indicated at 712, 722, 724, and 734. The user and AI asset time steams may be adjusted relative to each other by using different time intervals $\Delta t_u$, $\Delta t_{AI}$. Specifically, the time stream for the user asset may be run faster if the user time interval $\Delta t_u$ is smaller than the AI time interval $\Delta t_{AI}$. The faster time stream for the player character gives the user a feeling of power of the circle of AI assets that are engaging that user.

It is noted that because each machine has its own independent time stream, if an AI is running on a player's machine both the player and the AI react to each other in the same time stream. It follows that linked animations such as grabs, throws, hit reactions and attacks between player and AI assets are in phase, both from the point of view of the machine running the player who is being targeted by that AI, and from the point of view of a spectator. observing the player fighting the AI assets.

In some embodiments, a networking update code can run at the beginning of a game frame update. The update code can select some number n most important objects to send over the network. These n objects can be selected from a set of potential objects to send, which is the set of objects that machine currently has authority over. The update code can use a priority accumulator to determine the n most important objects to send. The priority accumulator can increment priority per-object, per-node to send to (unique packets can be constructed to send to each other node P2P). The priority accumulator can increase the priority of each object per-node by some priority increment $\Delta P$ for each time increment $\Delta t$. When an object is included in a packet and sent its priority can be set to zero. Eventually the priority for that object will bubble up to a sufficiently high value that the networking code will select it to be sent again later. The priority increment $\Delta P$ can be scaled per-object giving some objects faster priority accumulation than others. By way of example, and not by way of limitation, local players may have the highest priority for sends. Therefore object state updates can be distributed across the set of candidate objects to send, even when there are potentially more objects to send than can fit in a single packet. Objects can be anything, player character assets, AI assets other objects in the world, and the like. The code can be made generic such that all that is relevant to the code is the potential set of objects to send. As such, the code need not distinguish between AI assets and players.

Figure 8:
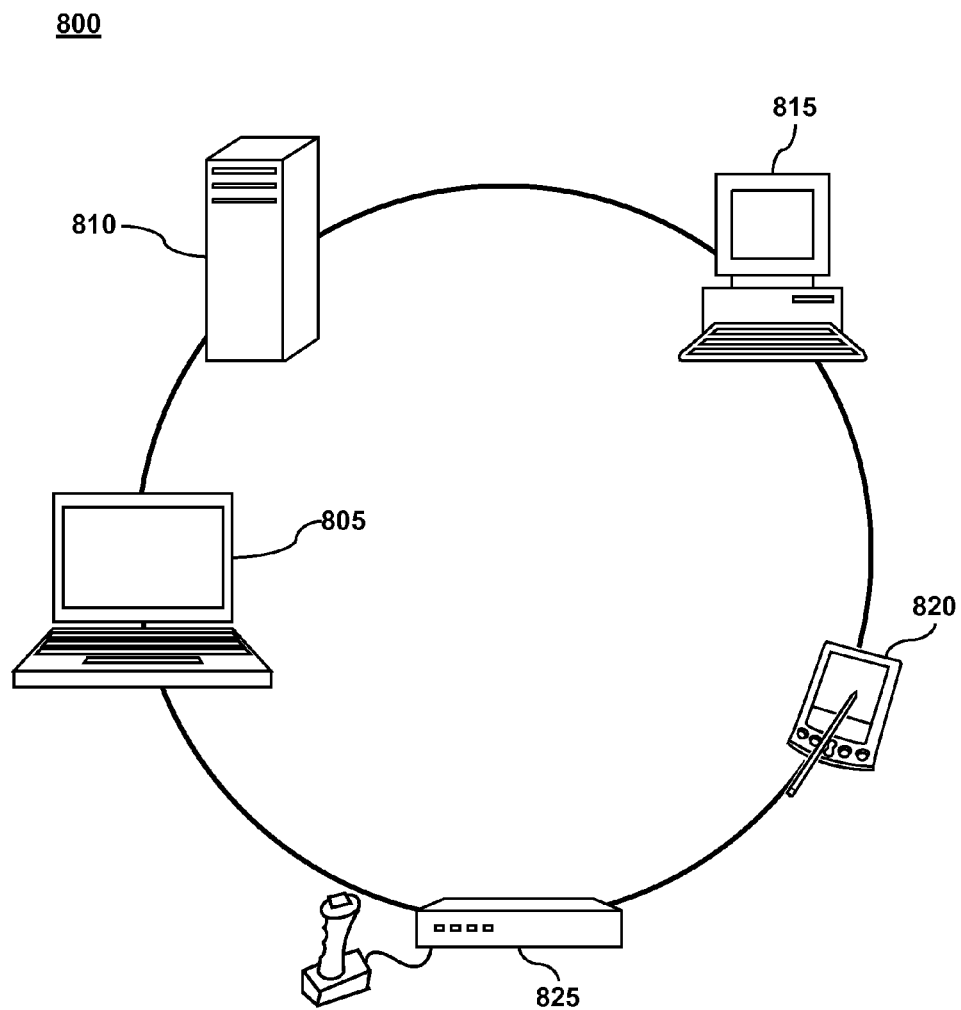
FIG. 8 illustrates a set of information processing devices suitable for implementing a peer-to-peer (P2P) network that can configured to transfer authority transfer over AI assets according to an embodiment of the invention.

As noted above, embodiments of the invention may be implemented using a P2P network. FIG. 8 illustrates a set of information processing devices suitable for implementing a P2P network 800 suitable for broadcasting messages according to an embodiment of the invention. The nodes of P2P network 800 may include laptop or portable computers 805; server computers 810; desktop computers and workstations 815; mobile computing devices 820 such as mobile phones, personal digital assistants, portable digital media players, and portable or handheld game consoles; and home entertainment devices 825 such as video game consoles, digital media players, set-top boxes, media center computers and storage devices. The network 800 can include any number of each type of device independent of the number of devices of other types. Each device may implement the functionality of one or more nodes of the network 800. For each device, the functionality of one or more nodes may be implemented in hardware, software, firmware, or any combination thereof. Node functionality in software may be a part of an application, a library, an application programming interface, and/or an operating system. Furthermore, each node of the network 800 may be connected with other nodes via any type of wired or wireless network connection, incorporating any type of electrical, optical, radio, or other communications means. The network 800 may encompass both local-area networks and wide-area networks, such as the Internet.

In a further embodiment, some devices of the network 800 may have restricted capabilities. For example, only a limited subset of nodes of the network 800 may be allowed to initiate broadcast messages. The remaining nodes may only be permitted to forward and/or process broadcast message. In still a further embodiment, all or a subset of the nodes of the overlay network 800 are capable of authenticating broadcast messages. Such a configuration may be implemented to prevent the spread of unauthorized broadcast messages. Upon receiving a broadcast message, a node can first determine whether the broadcast message is authentic, for example by checking a cryptographic signature. If the broadcast message is authentic, it is processed and potentially forwarded to other nodes as described above. Otherwise, the broadcast message may be ignored.

Figure 9:
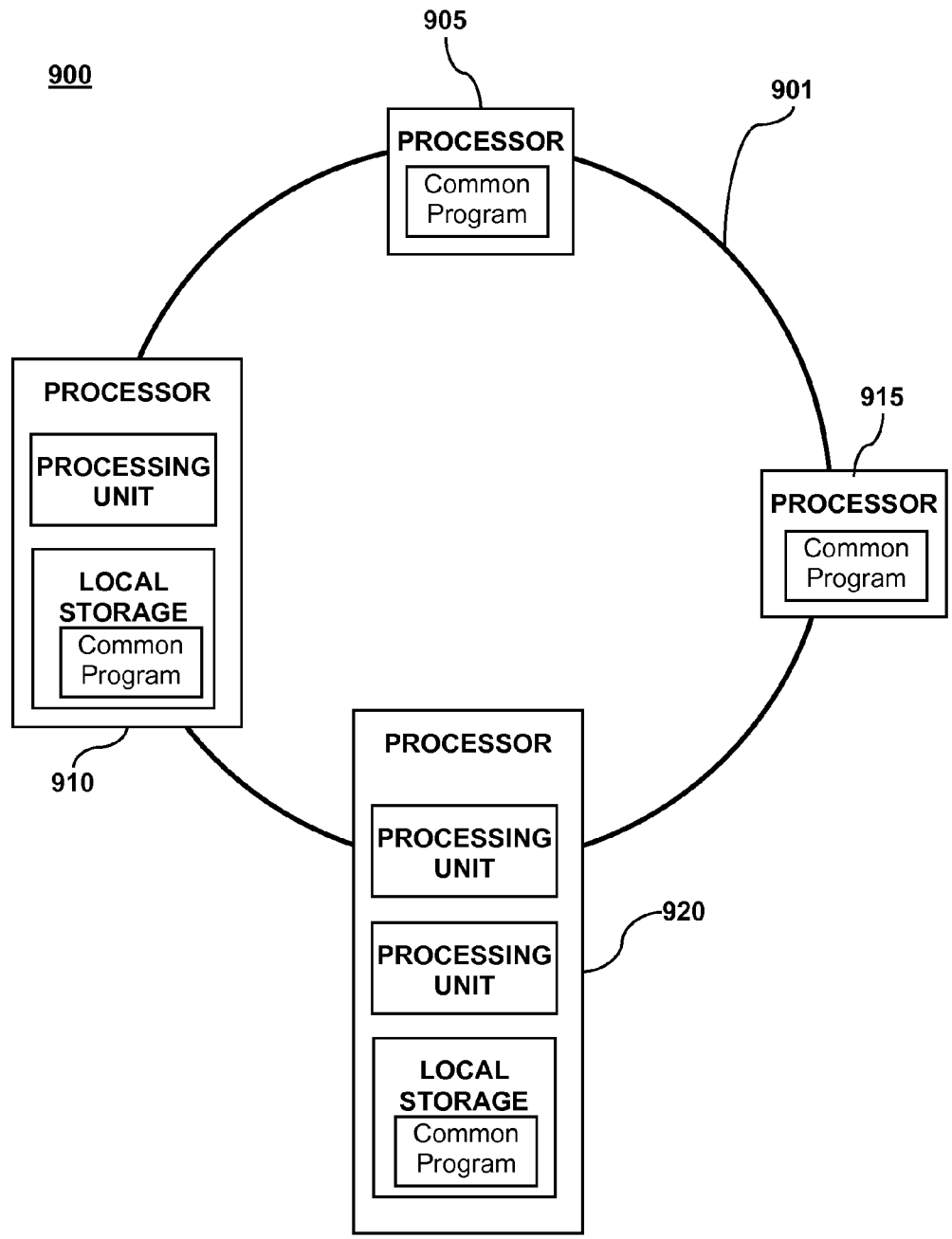
FIG. 9 illustrates a set of information processing devices suitable for implementing a P2P network according to an embodiment of the invention.

FIG. 9 illustrates a set of information processing devices suitable for implementing P2P network 900 according to an embodiment of the invention. The overlay network 900 enables processors connected over a data bus 901 to transfer authority over AI assets used in an online program. The data bus 901 may use any electrical, optical, or other type of data communication means capable of carrying data within and/or between integrated circuits.

The network 900 typically includes a plurality of processors 905, 910, 915, and 920. In further embodiments, network 900 may include thousands or millions of processors. Each processor may be a microprocessor, microcontroller, system on a chip processor, digital signal processor, application specific integrated circuit (ASIC), programmable logic device and/or any other type of information processing device. Each processor may further include one or more processing units capable of independently executing sequences of information processing instructions or processing information according to a fixed algorithm. Each processor may include local data storage as well as access to common or shared data storage.

Figure 10:
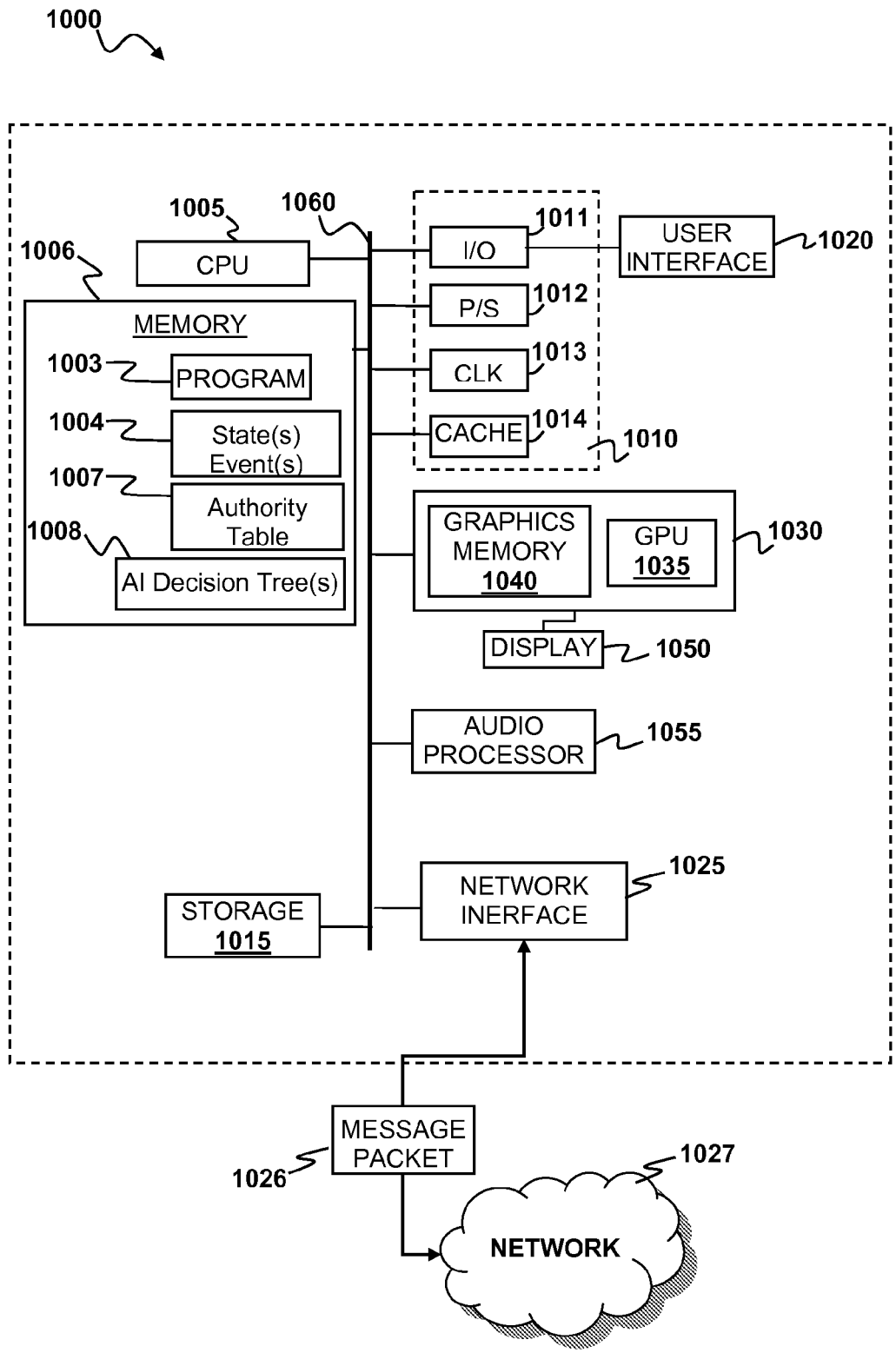
FIG. 10 illustrates the components of an information processing device suitable for implementing a node of an overlay network according to an embodiment of the invention.

FIG. 10 is a block diagram illustrating the components of an information processing device 1000 suitable for implementing a method for controlling authority over an artificial intelligence (AI) asset among two or more processing devices running a common program over a network. By way of example, and without loss of generality, the information processing device 1000 may be implemented as a computer system, such as a personal computer, video game console, portable game device, personal digital assistant, mobile device (e.g., a cell phone or smart phone) or other digital device, suitable for practicing an embodiment of the invention. The processing device 1000 may include a central processing unit (CPU) 1005 configured to run software applications and optionally an operating system. The CPU 1005 may include one or more processing cores. By way of example and without limitation, the CPU 1005 may be a parallel processor module, such as a Cell Processor. An example of a Cell Processor architecture is described in detail, e.g., in *Cell Broadband Engine Architecture*, copyright International Business Machines Corporation, Sony Computer Entertainment Incorporated, Toshiba Corporation Aug. 8, 2005 a copy of which may be downloaded at http://cell.scei.co.jp/, the entire contents of which are incorporated herein by reference.

A memory 1006 may be coupled to the CPU 1005. The memory 1006 may store applications and data for use by the CPU 1005. The memory 1006 may be in the form of an integrated circuit, e.g., RAM, DRAM, ROM, and the like). A computer program 1003 may be stored in the memory 1006 in the form of instructions that can be executed on the processor 1005. The memory 1006 may store broadcast messages 1004 that have either been initiated by the program 1003 or received from other nodes. Such messages may include information relating a state or events for AI assets or user assets. The memory 1006 may also contain an authority table 1007. The authority table contains information identifying program assets for which the processing device 1000 has authority. Such program assets can include user assets over which the processing device 1000 has exclusive authority and AI assets with transferable authority. The memory 1006 may also include one or more decision trees that determine changes in state and/or events for one or more corresponding AI assets.

The program 1003 can include instructions configured for execution by the CPU 1005. The instructions may be configured to implement a method for controlling authority over AI assets among two or more processing devices running a common program over a network 1027. According to the method, the processing device 1000 may exercise authority over the AI by executing code that controls one or more actions of the AI asset. The code may include one of the decision trees 1008. The state of the AI asset may be broadcast from the processing device 1000 to one or more other devices running the common program over the network 1027. When it is determined according to the decision tree that the AI asset should engage a program asset over which another processing device running the common program has authority, the processing device 1000 can relinquish authority over the AI asset with the by stopping execution of the code and transferring authority over the AI asset from the first processing device to one or more other processing devices.

The program 1003 can be a program where a user (e.g., a player) controls some avatar object, and there are other objects that are non-player controlled which "engage" and interact directly with that player players avatar in some direct way that requires the time being in phase between the player and non-player objects. By way of example, and not by way of limitation, the program 1003 may be part of a video game program that allows users of different peer processing devices to participate in a game online over a network. Alternatively, the program 1003 may be part of a program that implements a virtual world that allows uses of different processing devices to interact with each other and with a computer simulated environment over a network of such processing devices.

The processing device 1000 may also include well-known support functions 1010, such as input/output (I/O) elements 1011, power supplies (P/S) 1012, a clock (CLK) 1013 and cache 1014. The processing device 1000 may further include a storage device 1015 that provides non-volatile storage for applications and data. By way of example, the storage device 1015 may be a fixed disk drive, removable disk drive, flash memory device, tape drive, CD-ROM, DVD-ROM, Blu-ray, HD-DVD, UMD, or other optical storage devices.

One or more user input devices 1020 may be used to communicate user inputs from one or more users to the processing device 1000. By way of example, one or more of the user input devices 1020 may be coupled to the processing device 1000 via the I/O elements 1011. Examples of suitable input device 1020 include keyboards, mice, joysticks, touch pads, touch screens, light pens, still or video cameras, and/or microphones. A network interface 1025 allows the processing device 1000 to communicate with other computer systems via an electronic communications network 1027. The network interface 1025 may include wired or wireless communication over local area networks and wide area networks such as the Internet. The processing device 1000 may send and receive data, e.g., broadcast messages, in the form of one or more message packets 1026 over the network 1027.

The processing device 1000 may further comprise a graphics subsystem 1030, which may include a graphics processing unit (GPU) 1035 and graphics memory 1040. The graphics memory 1040 may include a display memory (e.g., a frame buffer) used for storing pixel data for each pixel of an output image. The graphics memory 1040 may be integrated in the same device as the GPU 1035, connected as a separate device with GPU 1035, and/or implemented within the memory 1006. Pixel data may be provided to the graphics memory 1040 directly from the CPU 1005. Alternatively, the CPU 1005 may provide the GPU 1035 with data and/or instructions defining the desired output images, from which the GPU 1035 may generate the pixel data of one or more output images. The data and/or instructions defining the desired output images may be stored in memory 1010 and/or graphics memory 1040. In an embodiment, the GPU 1035 may be configured (e.g., by suitable programming or hardware configuration) with 3D rendering capabilities for generating pixel data for output images from instructions and data defining the geometry, lighting, shading, texturing, motion, and/or camera parameters for a scene. The GPU 1035 may further include one or more programmable execution units capable of executing shader programs.

The program 1003 may interact with the graphics subsystem as follows. Execution of the program instructions may define and regularly update state values for user program assets, AI assets and other assets. These state values may determine position, orientation, motion, and actions for these assets. The program may convert these state values may be converted into values representing image components. These GPU 1035 may convert the image component values to pixel data for an image. The pixel data may be temporarily stored in the graphics memory 1040.

The graphics subsystem 1030 may periodically output pixel data for an image from graphics memory 1040 to be displayed on a display device 1050. The display device 1050 may be any device capable of displaying visual information in response to a signal from the processing device 1000, including CRT, LCD, plasma, and OLED displays. The computer system 1000 may provide the display device 1050 with an analog or digital signal. By way of example, the display 1050 may include a cathode ray tube (CRT) or flat panel screen that displays text, numerals, graphical symbols or images. In addition, the display 1050 may include one or more audio speakers that produce audible or otherwise detectable sounds. To facilitate generation of such sounds, the system 1000 may further include an audio processor 1055 adapted to generate analog or digital audio output from instructions and/or data provided by the CPU 1005, memory 1006, and/or storage 1015.

The components of the processing device 1000, including the CPU 1005, memory 1006, support functions 1010, data storage 1015, user input devices 1020, network interface 1025, graphics subsystem, and audio processor 1055 may be operably connected to each other via one or more data buses 1060. These components may be implemented in hardware, software or firmware or some combination of two or more of these.

Figure 11:
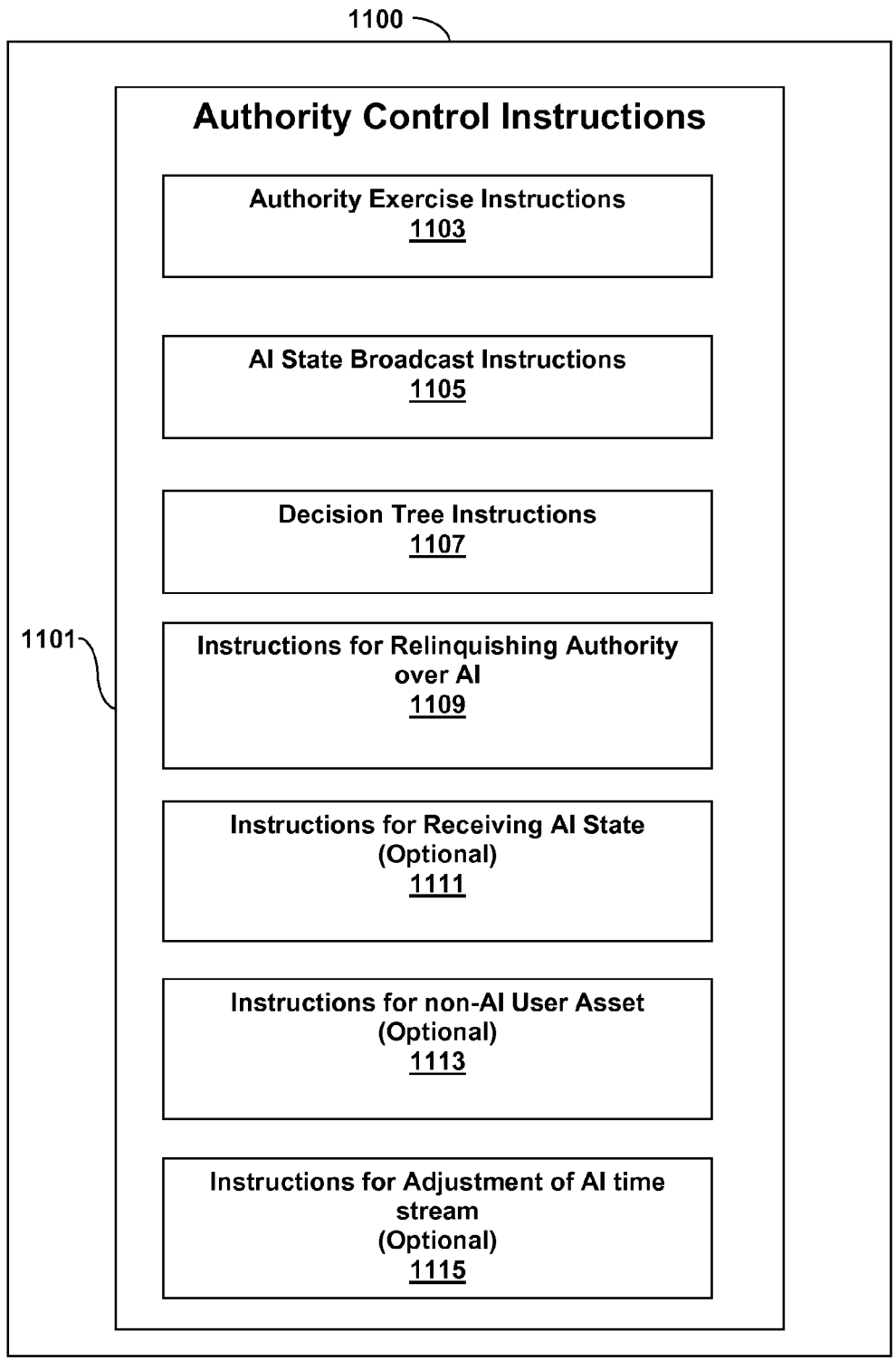
FIG. 11 illustrates an example of a computer-readable storage medium encoded with computer readable instructions for implementing authority transfer over AI assets in a peer overlay network in accordance with an embodiment of the present invention.

According to another embodiment, instructions for carrying out broadcasting in a peer-to-peer network may be stored in a computer readable storage medium. By way of example, and not by way of limitation, FIG. 11 illustrates an example of a non-transitory computer-readable storage medium 1100 in accordance with an embodiment of the present invention. The storage medium 1100 contains computer-readable instructions stored in a format that can be retrieved and interpreted by a computer processing device. By way of example and not by way of limitation, the computer-readable storage medium 1100 may be a computer-readable memory, such as random access memory (RAM) or read only memory (ROM), a computer readable storage disk for a fixed disk drive (e.g., a hard disk drive), or a removable disk drive. In addition, the computer-readable storage medium 1100 may be a flash memory device, a computer-readable tape, a CD-ROM, a DVD-ROM, a Blu-Ray, HD-DVD, UMD, or other optical storage medium.

The storage medium 1100 contains authority control instructions 1101 configured to control authority over an artificial intelligence (AI) asset among two or more processing devices running a common program over a network. The authority control instructions 1101 may be configured to implement broadcasting in accordance with the methods as described above with respect to FIG. 3 through FIG. 5D. In addition, the authority control instructions 1101 may include authority exercise instructions 1103 that exercise authority over the AI asset with a first processing device when executed on a processing device. The authority exercise instructions may include decision tree instructions 1107. The Authority control instructions 1101 may further include AI state broadcast instructions 1105 that broadcast a state of the AI asset from the first device to one or more other devices running the common program over the network when executed by the processing device.

The decision tree instructions 1107 may be configured to determine according that the AI asset should engage a program asset over which another processing device running the common program has authority when executed. This may trigger execution of one or more Instructions for Relinquishing Authority 1109 that stop execution of the authority exercise instructions 1103, and/or AI state broadcast instructions 1105 and/or decision tree instructions 1107 and transfer authority over the AI asset from the processing device to the other processing device.

The authority control instructions 1101 may optionally include instructions 1111 for receiving an AI state or instructions 1113 for control of a non-AI user Asset. In addition, the authority control instructions 1101 may also optionally include instructions 1115 for adjustment of a time stream of an AI asset, e.g., as illustrated with respect to FIG. 7.

Although the present invention has been described in considerable detail with reference to certain preferred versions thereof, other versions are possible. For example, although certain embodiments are described in which the overlay is described as a Chord overlay, embodiments of the invention may include implementations in which the overlay is implemented according to some other protocol. Therefore, the spirit and scope of the appended claims should not be limited to the description of the preferred versions contained herein. Instead, the scope of the invention should be determined with reference to the appended claims, along with their full scope of equivalents.

All the features disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features. Any feature, whether preferred or not, may be combined with any other feature, whether preferred or not. In the claims that follow, the indefinite article "A", or "An" refers to a quantity of one or more of the item following the article, except where expressly stated otherwise. Any element in a claim that does not explicitly state "means for" performing a specified function, is not to be interpreted as a "means" or "step" clause as specified in 35 USC §112, ¶6. In particular, the use of "step of" in the claims herein is not intended to invoke the provisions of 35 USC §112, ¶6.

The reader's attention is directed to all papers and documents which are filed concurrently with this specification and which are open to public inspection with this specification, and the contents of all such papers and documents incorporated herein by reference.

What is claimed is:

1. A computer implemented method for controlling authority over a plurality of artificial intelligence (AI) assets among a plurality of processing devices running a common program over a network, the method comprising:
    a) initially exercising authority over a first AI asset with a first processing device by executing code on the first processing device, wherein the code for the first AI asset controls one or more actions of the first AI asset, wherein the code for the first AI asset includes a decision tree;
    b) initially exercising authority over a second AI asset with the first processing device by executing code on the first processing device, wherein the code for the second AI asset controls one or more actions of the second AI asset, wherein the code for the second AI asset includes a decision tree;
    c) broadcasting a state of the first AI asset and the second AI asset from the first processing device to a plurality of other devices running the common program over the network;

d) making a determination according to the decision tree for the first AI asset that the first AI asset should engage a first user-controlled program asset over which a second processing device running the common program has authority, wherein the decision tree for the first AI asset determines whether to engage the first user-controlled program asset based on one or more criteria other than a distance between the first AI asset and the first user-controlled program asset;

e) making a determination according to the decision tree for the second AI asset that the second AI asset should engage a second user-controlled program asset over which a third processing device running the common program has authority, wherein the decision tree for the second AI asset determines whether to engage the second user-controlled program asset based on one or more criteria other than a distance between the second AI asset and the second user-controlled program asset; and f) in response to the determination according to the decision tree for the first AI asset, triggering a relinquishment of the authority over the first AI asset with the first processing device by stopping execution of the code for the first AI asset on the first processing device and transferring authority over the first AI asset from the first processing device to the second processing device; and g) in response to the determination according to the decision tree for the second AI asset, triggering a relinquishment of the authority over the second AI asset with the first processing device by stopping execution of the code for the second AI asset on the first processing device and transferring authority over the second AI asset from the first processing device to the third processing device.

2. The method of claim 1, further comprising, after f) receiving at the first processing device the state of the first AI asset from the second processing device to which the authority over the first AI asset has been transferred.

3. The method of claim 1 wherein the common program is a game program and the AI assets are non-player characters in the game program.

4. The method of claim 3 wherein the first processing device controls the actions of a player character and broadcasts a state of that player character to one or more other devices running the common program over the network.

5. The method of claim 1, further comprising, receiving the state of another AI asset at the first processing device from another device running the common program over the network, wherein the first processing device has no authority over the other AI asset.

6. The method of claim 1 wherein the first processing device is a default processing device for the first AI asset.

7. The method of claim 1 wherein authority over the first AI asset was transferred to the first processing device from another processing device on the network.

8. The method of claim 1 wherein a) includes executing code on a first processing device, wherein the code controls one or more actions of more than one AI asset.

9. The method of claim 1, further comprising exercising exclusive authority over a user asset of the common program that is uniquely associated with a user of the first processing device by executing code on the first processing device, wherein the code controls one or more actions of the user asset.

10. The method of claim 9, wherein the common program is a game program, wherein each of the AI assets is a non-player character, and each of the user-controlled program assets is a player character.

11. The method of claim 9, further comprising adjusting a time stream of the first AI asset relative to a time stream of the first user-controlled program asset with the first processing device.

12. The method of claim 1 wherein the first processing device has default authority over the AI asset.

13. The method of claim 12, further comprising: when the first AI asset is no longer engaged with the first program asset sending a release authority event to the first processing device.

14. The method of claim 13 wherein sending the release authority event further includes sending a hint to the first processing device, wherein the hint indicates which processing device should have authority over the first AI asset.

15. The method of claim 1, wherein c) includes accumulating a priority for a plurality of game assets over which the first processing device has authority, determining a number n highest priority objects to update and sending updates of the state of the n highest priority objects from the first processing device to the other processing devices.

16. The method of claim 15 wherein priority accumulates for different objects or different processing devices at different rates.

17. A first processing device, comprising:
a processor;
a memory; and
one or more processor executable instructions embodied in the memory and configured for execution on the processor, wherein the instructions are configured to implement a method for controlling authority over a plurality of artificial intelligence (AI) assets among a plurality of processing devices running a common program over a network, the method comprising:

a) initially exercising authority over a first AI asset with the first processing device by executing code on the first processing device, wherein the code for the first AI asset controls one or more actions of the first AI asset, wherein the code for the first AI asset includes a decision tree;

b) initially exercising authority over a second AI asset with the first processing device by executing code on the first processing device, wherein the code for the second AI asset controls one or more actions of the second AI asset, wherein the code for the second AI asset includes a decision tree;

c) broadcasting a state of the first AI asset and the second AI asset from the first processing device to a plurality of other devices running the common program over the network;

d) making a determination according to the decision tree for the first AI asset that the first AI asset should engage a first user-controlled program asset over which a second processing device running the common program has authority, wherein the decision tree for the first AI asset determines whether to engage the first user-controlled program asset based on one or more criteria other than a distance between the first AI asset and the first user-controlled program asset;

e) making a determination according to the decision tree for the second AI asset that the second AI asset should engage a second user-controlled program asset over which a third processing device running the common program has authority, wherein the decision tree for the second AI asset determines whether to engage the second user-controlled program asset based on one or more criteria other than a distance between the second AI asset and the second user-controlled program asset; and f) in response to the determination according to the decision tree for the first AI asset, triggering a relinquishment of the authority over the first AI asset with the first processing device by stopping execution of the code for the first AI asset on the first processing device and transferring authority over the first AI asset from the first processing device to the second processing device; and g) in response to the determination according to the decision tree for the second AI asset, triggering a relinquishment of the authority over the second AI asset with the first processing device by stopping execution of the code for the second AI asset on the first processing device and transferring authority over the second AI asset from the first processing device to the third processing device.

18. The first processing device of claim 17, wherein the first processing device has default authority over the first AI asset.

19. The first processing device of claim 17, wherein the first processing device has default authority over the first AI asset and one or more other AI assets.

20. The first processing device of claim 17, wherein the first processing device has exclusive authority over an asset of the common program that is uniquely associated with a user of the processing device.

21. A non-transitory computer-readable medium having embodied therein one or more processor executable instructions configured to implement a method for controlling authority over a plurality of artificial intelligence (AI) assets among a plurality of processing devices running a common program over a network, the method comprising:

a) initially exercising authority over a first AI asset with a first processing device by executing code on the first processing device, wherein the code for the first AI asset controls one or more actions of the first AI asset, wherein the code for the first AI asset includes a decision tree;

b) initially exercising authority over a second AI asset with the first processing device by executing code on the first processing device, wherein the code for the second AI asset controls one or more actions of the second AI asset, wherein the code for the second AI asset includes a decision tree;

c) broadcasting a state of the first AI asset and the second AI asset from the first processing device to a plurality of other devices running the common program over the network;

d) making a determination according to the decision tree for the first AI asset that the first AI asset should engage a first user-controlled program asset over which a second processing device running the common program has authority, wherein the decision tree for the first AI asset determines whether to engage the first user-controlled program asset based on one or more criteria other than a distance between the first AI asset and the first user-controlled program asset;)

e) making a determination according to the decision tree for the second AI asset that the second AI asset should engage a second user-controlled program asset over which a third processing device running the common program has authority, wherein the decision tree for the second AI asset determines whether to engage the second user-controlled program asset based on one or more criteria other than a distance between the second AI asset and the second user-controlled program asset; and f) in response to the determination according to the decision tree for the first AI asset, triggering a relinquishment of the authority over the first AI asset with the first processing device by stopping execution of the code for the first AI asset on the first processing device and transferring authority over the first AI asset from the first processing device to the second processing device; and g) in response to the determination according to the decision tree for the first AI asset, triggering a relinquishment of the authority over the second AI asset with the first processing device by stopping execution of the code for the second AI asset on the first processing device and transferring authority over the second AI asset from the first processing device to the third processing device.

* * * * *